United States Patent
Viault et al.

(10) Patent No.: US 10,458,465 B2
(45) Date of Patent: Oct. 29, 2019

(54) CAM FOLLOWER ROLLER DEVICE

(71) Applicant: Aktiebolaget SKF, Gothenburg (SE)

(72) Inventors: Samuel Viault, Saint-Anthoine-du-Rocher (FR); Charles Chambonneau, Joué lès Tours (FR); Mickael Chollet, Joué-lès-Tours (FR); Thomas Perrotin, Saint Roch (FR); Michel Rabin, Monterfil (FR); Philippe Walter, Fondettes (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/795,885

(22) Filed: Oct. 27, 2017

(65) Prior Publication Data
US 2018/0119732 A1    May 3, 2018

(30) Foreign Application Priority Data

Oct. 28, 2016    (DE) .................. 10 2016 221 290

(51) Int. Cl.
| | |
|---|---|
| *F01L 1/14* | (2006.01) |
| *F16C 13/02* | (2006.01) |
| *F16H 53/06* | (2006.01) |
| *F16C 13/00* | (2006.01) |

(52) U.S. Cl.
CPC .......... *F16C 13/022* (2013.01); *F16C 13/006* (2013.01); *F16H 53/06* (2013.01); *F01L 1/14* (2013.01); *F16C 2360/22* (2013.01)

(58) Field of Classification Search
CPC .......... F16C 13/022; F16H 53/06; F01L 1/14
USPC .......... 123/90.48, 90.52, 90.55, 90.39, 90.44
See application file for complete search history.

(56) References Cited

U.S. PATENT DOCUMENTS 10,006,425 B2 * 6/2018 Berruet ................ F02M 59/102
123/90.48

FOREIGN PATENT DOCUMENTS

| | | |
|---|---|---|
| EP | 2853738 A1 | 4/2015 |
| EP | 3026255 A1 | 6/2016 |
| EP | 3121436 A1 | 1/2017 |
| FR | 2946406 A1 | 12/2010 |
| FR | 2998629 A1 | 5/2014 |

* cited by examiner

*Primary Examiner* — Ching Chang
(74) *Attorney, Agent, or Firm* — Bryan Peckjian; SKF USA Inc. Patent Dept.

(57) ABSTRACT

A cam follower roller device having a tappet extending along a longitudinal axis and including a cylindrical tappet body defining a bore. The device further having a rolling assembly arranged within the bore, and including a support body with a base and flanges, a pin and a roller. Each of the flanges of the support body is provided with an outwardly protruding portion that extends transversally from the flange towards the tappet body. The tappet body includes a support diametrically opposed and having each a transverse surface that cooperates with the protruding portion of the support body to longitudinally block the support body.

9 Claims, 3 Drawing Sheets

CAM FOLLOWER ROLLER DEVICE

CROSS-REFERENCE

This application claims priority to German patent application no. 102016221290.7 filed on Oct. 28, 2016, the contents of which are fully incorporated herein by reference.

TECHNOLOGICAL FIELD

The invention relates to a cam follower roller device, in particular for use in an injection pump or a valve actuator for a motor vehicle. The invention also concerns an injection pump for a motor vehicle, equipped with a cam follower roller device. The invention also concerns a valve actuator for a motor vehicle, equipped with a cam follower roller device.

BACKGROUND

Classically, a cam follower roller device belonging to an injection pump comprises at least a tappet, a roller and a pin in bronze or steel. The roller is rotatably mounted on the pin and the rolling assembly is centered on a transverse axis, while the tappet extends along a longitudinal axis. The tappet is formed with a cylindrical body delimiting an internal volume wherein are arranged the pin and the roller.

The roller axially extends from the tappet so as to collaborate with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis.

It is known from FR-A-2 946 406 to provide a support body within the tappet body to support the rolling assembly. The ends of the pin are fixed, for example by press-fit, in through holes formed in a peripheral wall of the support body and disposed opposite one another. However, vibrations or shocks may dissociate the support body from the tappet body.

FR-A-2 998 629 further proposes a support body seated on a base of the tappet body, the support body comprising two support portions of semicircular profile and opened to the upper side of the device to support the pin ends. However, such an assembly requires a complex tappet design with an inner base seat for the support body.

SUMMARY

The aim of the invention is to propose an improved cam follower roller device including a support body, with efficient means to retain the rolling assembly within the tappet body, of reduced cost, with a longer service life and with an improved assembly process.

To this end, the invention relates to a cam follower roller device comprising a tappet extending along a longitudinal axis and including a cylindrical tappet body defining a bore. The cam follower roller device further comprises a rolling assembly arranged within the bore. The rolling assembly comprises a support body, a pin and a roller. The support body comprises a base and two longitudinal flanges that are diametrically opposed and that extend longitudinally from the base in the bore of tappet body. The pin is centered on a transverse axis and comprises two opposite ends each adapted to be supported by the flanges of support body. The roller is rotatably mounted on the pin around the transverse axis.

According to the invention, each of the flanges of the support body is provided with an outwardly protruding portion that extends transversally from the flange towards the tappet body, and the tappet body comprises support means being diametrically opposed and having each a transverse surface that cooperates with the protruding portion of the support body to longitudinally block the support body.

Thanks to the invention, the support body of the rolling assembly is longitudinally maintained within the tappet body. The device can be transported and installed without the risk of losing elements.

Such a cam follower roller device does not require any additional element to be manufactured, mounted and fixed for ensuring the longitudinal maintain of the rolling assembly within tappet body. Then the proposed invention is cost effective and material saving.

Moreover, the tab provided with the longitudinal retention means extends longitudinally within the cavity defined by the tappet body. The design is longitudinally and transversally compact and suitable for use in an injection pump or a valve actuator for a motor vehicle.

According to further aspects of the invention which are advantageous but not compulsory, such a cam follower roller device may incorporate one or several of the following features:

The outwardly protruding portions of flanges are in the transverse extension of the base.

The outwardly protruding portions of flanges comprise each an upper sloped surface, so as to ease the insertion of the portions in the bore of tappet body.

The outwardly protruding portions of flanges comprise each a bulge, in particular of semi-spherical shape or of truncated cone.

Bore of tappet body comprises recesses comprising each a transverse surface that cooperates with a protruding portion of a flange.

The recesses consist in openings provided through the tappet body.

Tappet body comprises second longitudinal retention means for the rolling assembly.

Second longitudinal retention means of tappet body comprises at least one transverse portion extending from the cylindrical portion of tappet body towards the interior of the tappet body.

Second longitudinal retention means cooperate with end of pin or with flange of support body supporting the end of pin.

The cam follower roller device comprises a rolling bearing interposed between the pin and the roller.

The cam follower roller device comprises a sliding bushing interposed between the pin and the roller.

The cam follower comprises at least one anti-rotation device on an outer periphery of the tappet body.

The tappet body is made of a synthetic material, for example of polyamide or polyether-ether-ketone.

The tappet body is made of metal, for example of steel.

The support body is made of metal, for example of steel.

The holding means are made of metal, for example from a stamped metal sheet made of steel or from a sintered metal.

Support body is made of two different materials, the protruding portions being made in a more deformable material than the material of base and flanges.

Protruding portions are made of synthetic material, for example of polyamide or polyether-ether-ketone.

Protruding portions are made of synthetic material and are overmoulded onto the base made of metal.

The support body is integral, the protruding portions being formed by material deformation of the flanges.

The lateral flanges comprise support means for the ends of the pin, the support means of the lateral flanges comprising a concave portion of semi-circular profile and opened to the upper side of the device.

The lateral flanges comprise support means for the ends of the pin, the support means of the lateral flanges comprising a cylindrical bore wherein is inserted an end of the pin.

The invention also concerns an injection pump for a motor vehicle, equipped with a cam follower roller device as mentioned here-above.

The invention also concerns a valve actuator for a motor vehicle, equipped with a cam follower roller device as mentioned here-above.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
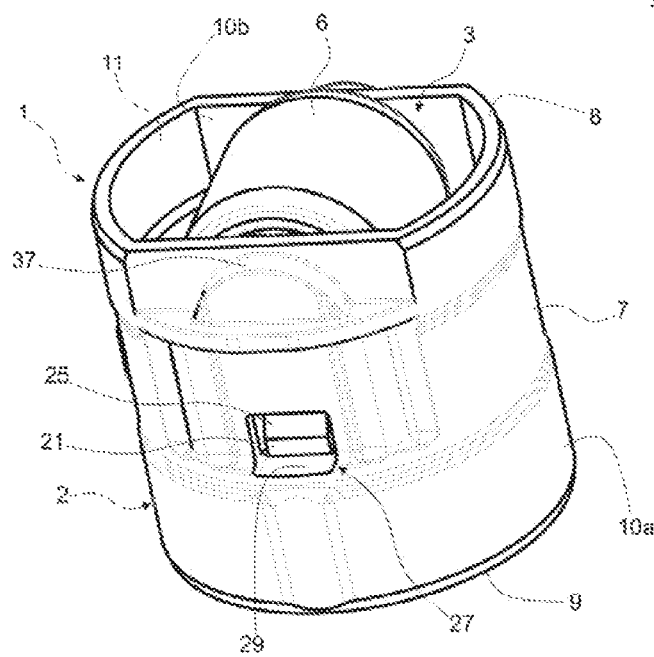
FIG. 1 is a perspective top view of a cam follower roller device according to a first embodiment of the invention.
Figure 2:
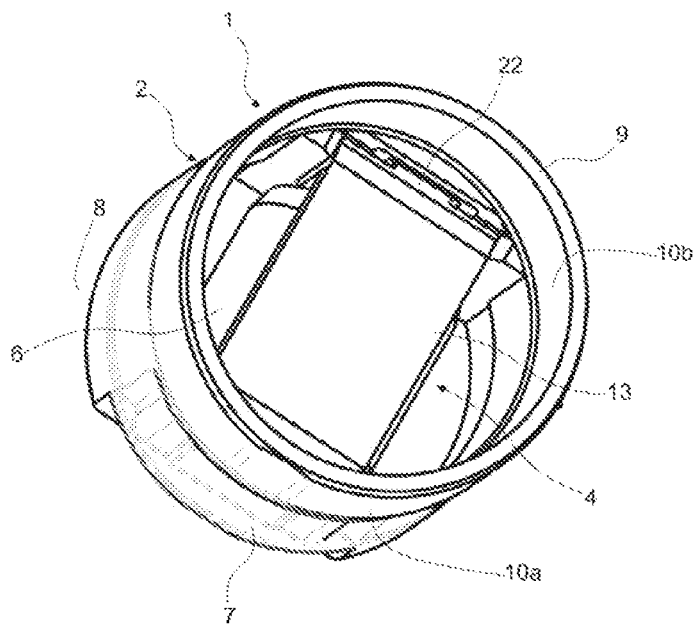
FIG. 2 is a perspective bottom view of the cam follower roller device.

The cam follower roller device 1 represented on FIGS. 1 to 4 is adapted to equip an injection pump for a motor vehicle, preferably for a gasoline car, not shown.

The device 1 comprises a tappet 2 and a rolling assembly 3 including a support body 4, a pin 5 and a roller 6. Pin 5 and roller 6 are centered on a transverse axis X5, while tappet 2 is centered along a longitudinal axis X2. Axis X2 and X5 are perpendicular.

Hereinafter, to facilitate the special identification of the device 1 for these figures and for the following ones, the adjectives "longitudinal" and "transverse" and the adverbs "longitudinally" and "transversally" are defined relative to the axis X2 and X5, respectively. Thus, a longitudinal portion or part is parallel to the axis X2, whilst a transverse portion or part is perpendicular to the axis X2 and parallel to the axis X5.

Tappet 2 comprises a cylindrical tappet body 7 centered on axis X2 and extending between an upper edge 8 and a lower edge 9. Tappet body 7 defines a cylindrical outer surface 10a and a cylindrical inner bore 10b delimiting a cavity 11 inside tappet 2. The cavity 11 is adapted to receive the rolling assembly 3. Tappet 2 is movable back and forth along axis X2, in a non-represented bore belonging to the injection pump or motor with surface 10a sliding in this bore. The surface 10a comprises anti-rotation means 10c, here a protruding portion dedicated to slide in an adapted groove provided in the bore, to prevent any rotation of the tappet 2 in this bore. Tappet 2 can be made of synthetic material, by example polyamide 6.6 (PA) or polyether-ether-ketone (PEEK), or made of metal, by example steel. Material of tappet 2 is chosen resistant to oil and its additives and temperature variations.

Rolling assembly 3 is arranged within the cavity 11 of tappet body 7. Rolling assembly 3 comprises support body 4 forming a support element for pin 5 and roller 6. Support body 4 comprises a base 13 centered on transverse axis X5. Two lateral flanges 14, 15 are opposite each other relative to the base 13 and longitudinally extend from the base 13 towards the upper side of the device 1.

Lateral flanges 14, 15 each comprises support means 16, 17 for the pin 5. The pin 5 is cylindrical and extends along the transverse axis X5. In the embodiment shown in FIG. 4, the support means 16, 17 of the lateral flanges 14, 15 each comprises a concave portion of semicircular profile and opened to the upper side of the device 1. The portions 16, 17 are adapted to receive ends 18, 19 of the pin 5. The profile of the concave portions 16, 17 fit the cylindrical ends 18, 19 of the pin 5. As an alternate not shown, the support means of the lateral flanges 14, 15 may comprise each a cylindrical bore wherein is inserted an end of the pin. As an embodiment not illustrated, at least one end 18 or 19 may be secured to the corresponding support means 16 or 17, respectively.

Rolling assembly 3 further comprises roller 6 rotatably mounted on pin 5 by a roller bearing 20 with needles arranged between the pin 5 and roller 6. Alternatively, the roller bearing may be replaced by a sliding bushing. Roller 6 longitudinally extends from the upper edge 8 of tappet 2 so as to collaborate with a cam synchronized with the internal combustion engine camshaft, not shown.

According to the invention, the rolling assembly 3 is longitudinally retained in the tappet 2 by means of protruding portions 21, 22.

The flanges 14, 15 of the support body 4 are each provided with an outwardly protruding portion 21, 22 that extends transversally from the flange 14, 15 respectively, towards the bore 10b of the tappet body 7.

The outwardly protruding portions 21, 22 define each a lower transverse surface 23, 24, respectively.

The outwardly protruding portions 21, 22 comprise each an upper sloped surface 25, 26, respectively.

The outwardly protruding portions 21, 22 are advantageously formed by material deformation of the flanges 14, 15.

As an alternate embodiment not shown, the flanges may comprise bulges, in particular of semi-spherical shape or of truncated cone.

According to the invention, the inner bore 10b of tappet body 7 comprises support means 27, 28 being diametrically opposed and having each a transverse surface 29, 30 respectively, that cooperates with the protruding portions 21, 22 respectively, of the support body 4.

Figures 3, 4:
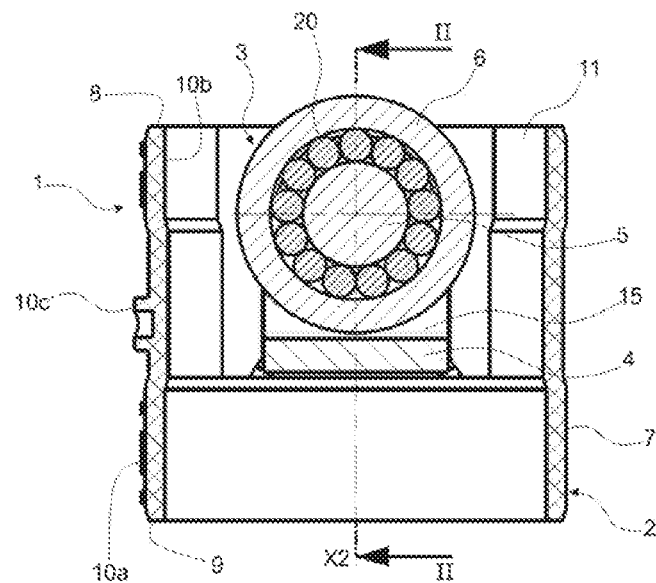
FIG. 3 is a sectional view along line I-I of the cam follower roller device.
FIG. 4 is a sectional view along line II-II of the cam follower roller device.
Figure 5:
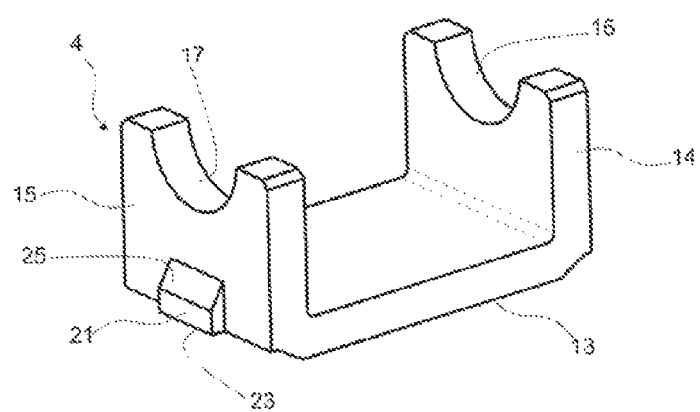
FIG. 5 is a perspective view of a support body dedicated to be arranged within the cam follower device.

In the present embodiment of FIG. 4, the support means of tappet body 7 consist in inwardly protruding portions 27, 28 extending from the inner surface of bore 10b and directed towards the flanges 14, 15 respectively, of the support body 4. The inwardly protruding portions 27, 28 define each an upper transverse surface 29, 30, and a lower transverse surface 31, 32 respectively.

The inwardly protruding portions 27, 28 are each topped by an opening 33, 34 provided through the thickness of tappet body 7, the lower edges of the openings defining the upper transverse surfaces 29, 30. As an alternate embodiment not shown, the openings may be replaced by recesses.

The lower transverse surfaces 23, 24 of the protruding portions 21, 22 extending from the support body are longitudinally supported by the upper transverse surfaces 29, 30 provided in the bore 10b of the tappet body 7.

The pin 5, the roller bearing 20 and the roller 6 are first assembled together, and then installed on the support means 16, 17 provided to the flanges 14, 15 of the support body so as to form the rolling assembly 3. The assembly 3 is then longitudinally inserted in the cavity 11 defined by the bore 10b of the tappet body 7, from the lower edge 9 towards the upper edge 8. The flanges 14, 15 are pushed in the cavity 11 and then the sloped surfaces 25, 26 of the protruding portions of the support body come into abutment against the lower surfaces 31, 32 of the support means 27, 28 in the cavity 11. The assembly 3 is pushed so that the sloped surfaces 25, 26 slide against the support means 27, 28. The tappet body 7 is then locally deformed. The protruding portions 21, 22 then pass the support means 27, 28, the lower transverse surfaces 23, 24 resting against the upper transverse surfaces 29, 30 of the support means 27, 28. The support body 4, hence the rolling assembly 3, is then longitudinally blocked in the tappet body 7 in one direction.

Tappet body 7 further comprises second longitudinal retention means 36, 37 for maintaining rolling assembly 3 within tappet 2. Second longitudinal retention means comprise each a transverse portion 36, 37 extending from the upper edge 8 of tappet body 7 directed towards the inner side of tappet body 7. Transverse portions 36, 37 are opposite each other towards the axis X2.

The transverse portions 36, 37 longitudinally cover ends 18, 19 of pin 5 so as to prevent any dismounting of the pin 5, hence rolling assembly 3, from the upper side of tappet body 7.

Rolling assembly 3 is then longitudinally maintained on one side by the cooperation between the outwardly protruding portions 21, 22 of support body 4 with inwardly protruding portions 27, 28 of tappet body 7, and on the other side by the second fixation means 36, 37 of tappet body 7.

What is claimed is:

1. A cam follower roller device comprising:
    a tappet extending along a longitudinal axis and including a cylindrical tappet body defining a bore,
    a rolling assembly arranged within the bore, and having:
        a support body including a base and two longitudinal flanges that are diametrically opposed and that extend longitudinally from the base in the bore of the cylindrical tappet body,
        a pin centered on a transverse axis and including two opposite ends, each adapted to be supported by the two longitudinal flanges of the support body, and
        a roller rotatably mounted on the pin around the transverse axis, wherein
    each of the two longitudinal flanges of the support body is provided with an outwardly protruding portion that extends transversally from each of the two longitudinal flanges towards the cylindrical tappet body, and wherein
    the cylindrical tappet body provides a support diametrically opposed and having each a transverse surface that cooperates with the outwardly protruding portion of the support body to longitudinally block the support body.

2. The cam follower roller device according to claim 1, wherein the outwardly protruding portion of each of the two longitudinal flanges comprises an upper sloped surface, to ease the insertion of the outwardly protruding portion in the bore of the tappet body.

3. The cam follower roller device according to claim 1, wherein the bore of the tappet body comprises recesses each having a transverse surface that cooperates with the outwardly protruding portion of one of the two longitudinal flanges.

4. The cam follower roller device according to claim 3, wherein the recesses consist in openings provided through the cylindrical tappet body.

5. The cam follower roller device according to claim 4, wherein the second longitudinal retention means cooperate with an end of pin or with a flange of support body supporting the end of pin.

6. The cam follower roller device according to claim 1, wherein the cylindrical tappet body comprises a second longitudinal retention means for the rolling assembly.

7. The cam follower roller device according to claim 6, wherein the second longitudinal retention means of the cylindrical tappet body comprises at least one transverse portion extending from the cylindrical tappet body towards an interior of the tappet body.

8. The cam follower roller device according to claim 1, wherein the support body is integral, the outwardly protruding portions being formed by material deformation of the two longitudinal flanges.

9. The cam follower roller device according to claim 1, wherein the outwardly protruding portion of each of the two longitudinal flanges is in the transverse extension of the base.

* * * * *